United States Patent [19]

Mottate

[11] Patent Number: 4,927,273
[45] Date of Patent: May 22, 1990

[54] LINEAR MOTION ROLLING CONTACT BEARING ASSEMBLY HAVING A FEED-IN PORT

[75] Inventor: Tatsuo Mottate, Mitaka, Japan

[73] Assignee: Nippon Thompson Co., Ltd., Tokyo, Japan

[21] Appl. No.: 222,605

[22] Filed: Jul. 21, 1988

[51] Int. Cl.$^5$ .............................. F16C 29/06
[52] U.S. Cl. ......................... 384/45; 384/43
[58] Field of Search ............ 384/43, 44, 45, 507, 384/508; 464/168

[56] References Cited

U.S. PATENT DOCUMENTS

| 4,647,226 | 3/1987 | Mottate | 384/45 |
| 4,701,057 | 10/1987 | Kashiwabara | 384/45 |
| 4,795,272 | 1/1989 | Mottate | 384/45 |

FOREIGN PATENT DOCUMENTS

| 14522 | 5/1972 | Japan | 384/507 |
| 59-172825 | 11/1984 | Japan . | |
| 2126667 | 3/1984 | United Kingdom | 384/507 |

*Primary Examiner*—Stuart S. Levy
*Assistant Examiner*—Paul Thomas Bowen
*Attorney, Agent, or Firm*—Skjerven, Morrill, MacPherson, Franklin & Freil

[57] ABSTRACT

A linear motion rolling contact bearing assembly includes a rail having a U-shaped transverse cross section and a pair of guide grooves defined on the opposite side walls of the rail and a slider which is received in the U-shaped rail to travel along the rail. The slider is preferably provided with a pair of endless circulation paths located side-by-side each of which is provided with a plurality of rolling members. A part of each of the endless circulation paths is defined as a load path section which is located opposite to the corresponding one of the pair of guide grooves and where the plurality of rolling members are partly exposed to come into engagement with the pair of guide grooves of the rail to provide a rolling contact between the slider and the rail. The slider is also provided with a feed-in port for each of the pair of endless circulation paths, and thus the rolling members may be fed into the endless circulation paths through the feed-in ports. The feed-in port is pluggable by a plugging member and thus the rolling member are prevented from escaping from the endless circulation path undesirably.

3 Claims, 2 Drawing Sheets

LINEAR MOTION ROLLING CONTACT BEARING ASSEMBLY HAVING A FEED-IN PORT

BACKGROUND OF THE INVENTION

1. Field of the Invention

This invention generally relates to a rolling contact bearing assembly including a rail and a slider which travels along a predetermined path as guided by the rail, and, in particular, to a linear motion rolling contact bearing assembly which allows a slider to move along a predetermined path defined by a rail in rolling contact therewith no matter how long the path is.

2. Description of the Prior Art

A linear motion rolling contact bearing assembly is well known in the art as disclosed in the Japanese Utility Model Laid-open Pub. No. 59-172825. A linear motion rolling contact bearing assembly includes a rail which extends straight over a predetermined length to define a predetermined path along which a slider travels. Typically, the rail is U-shaped in transverse cross section and the slider is located in the space defined by the U-shaped rail. That is, a pair of guide grooves is provided in the opposite side walls of the U-shaped rail to define the predetermined path. And, the slider is provided with a pair of endless circulation paths in which a number of rolling members are provided. Each of the endless circulation paths includes a straight load path section opposite to the corresponding one of the pair of guide grooves, a return path section in parallel with the load path section and a pair of curved connecting path sections, each connecting the corresponding ends of the load and return path sections. Thus, when the rolling members are located in the load path section, they are brought into rolling contact with the guide grooves formed in the guide rail so that the slider may travel in either direction while keeping rolling contact with the guide grooves of the rail. Typically, the rolling members are either spherical balls or cylindrical rollers, though modifications of these or any other types of rolling members may also be used.

In such a linear motion rolling contact bearing assembly, a plurality of rolling members must be provided in the pair of endless circulation paths of the slider and thus the slider must be defined in a split format. And, thus, since the slider is manufactured by assembling parts, for example, using bolts, rivets or the like, the slider cannot be manufactured with close tolerances. Accordingly, the guide grooves of a rail cannot be made at high accuracy, either, in order to accommodate the tolerance of the slider. As a result, a prior art linear motion rolling contact bearing assembly tended to be low in accuracy and thus was limited in the field of applications. For example, the prior art linear motion rolling contact bearing assembly was not suited for applications, such as high precision measuring equipment, small-scale high precision machine tools and electronics equipment.

SUMMARY OF THE INVENTION

In accordance with the principle of the present invention, there is provided a rolling contact bearing assembly including a rail defining a predetermined travelling path and a slider which travels along the predetermined path in rolling contact with the rail. The slider is provided with at least one endless circulation path which includes a load path section, a return path section and a pair of curved connecting path sections, each connecting the corresponding ends of the load and return path sections. The slider is also provided with a feed-in port which is in communication with the endless circulation path and which is pluggable by a plugging member. With this structure, a plurality of rolling members may be fed into the endless circulation path through the feed-in port which may be plugged upon completion of feeding of the rolling members. Such a structure allows to manufacture the slider with close tolerance and thus the entire bearing assembly may be manufactured with high accuracy, which, in turn, contributes to expand the field of applications.

In one embodiment, in accordance with the principle of the present invention, there is provided a linear motion rolling contact bearing assembly including a straight rail which is U-shaped in transverse cross section and provided with a pair of straight guide grooves formed on the opposite side walls thereof. The slider generally rectangular in shape is located in the space defined by the U-shaped guide rail and is provided with a pair of endless circulation paths, each of which includes a load path section opposite to the corresponding one of the pair of guide grooves, a return path section, and a pair of curved connecting path sections, each communicating the corresponding ends of the load and return path sections. A plurality of rolling members, preferably balls or rollers, are provided in each of the pair of endless circulation paths and thus the rolling members are brought into rolling contact with the pair of guide grooves of the rail when they are located in the load path sections to thereby provide rolling contact between the slider and the rail. The slider is also provided with a pair of pluggable feed-in ports, each in communication with the corresponding one of the pair of endless circulation paths. And, thus, the rolling members may be fed into the endless circulation paths through the feed-in ports. Upon completion of feeding of the rolling members, the feed-in ports are plugged by plugging members and thus each of the endless circulation paths defines a smooth guide surface.

In the preferred embodiment, the slider has a four part structure, i.e., an upper bearing plate, a lower bearing plate and a pair of end plates. The upper and lower bearing plates are identical in structure and a pair of endless circulation paths and also a pair of feed-in ports each in communication with the corresponding one of the pair of endless circulation paths are defined when the upper and lower bearing plates are combined. Each of the pair of feed-in ports has one end in communication with the corresponding one of the pair of endless circulation paths and has the other end exposed. Thus, a plurality of rolling members may be fed into each of the pair of endless circulation paths through the corresponding feed-in port. In the present embodiment, the pair of feed-in ports is formed at one end of the combined upper and lower bearing plates. And, a pair of end clearances is also defined in both ends of the combined upper and lower bearing plates. The pair of end plates can be snugly fitted in the end clearances so that the pair of feed-in ports is substantially plugged and thus the resulting assembly is generally rectangular in shape.

It is therefore a primary object of the present invention to obviate the disadvantages of the prior art as described above and to provide an improved rolling contact bearing assembly.

Another object of the present invention is to provide an improved linear motion rolling contact bearing assembly extremely compact in size and high in accuracy.

A further object of the present invention is to provide a small-sized linear motion rolling contact bearing assembly having an increased field of applications.

A still further object of the present invention is to provide an improved linear motion rolling contact bearing assembly easy to manufacture and thus low at cost.

Other objects, advantages and novel features of the present invention will become apparent from the following detailed description of the invention when considered in conjunction with the accompanying drawings.

BRIEF DESCRIPTION OF THE DRAWINGS

FIG. 3b is a schematic illustration showing the front end view of the bearing plate 2a;

FIG. 3c is a schematic illustration showing the side view of the bearing plate 2a;

DESCRIPTION OF THE PREFERRED EMBODIMENTS

Figure 1:
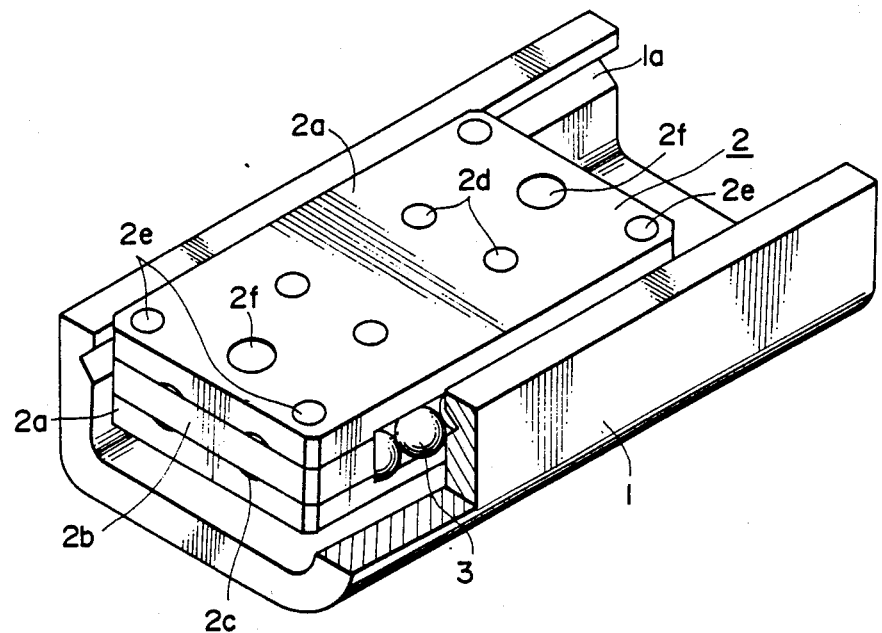
FIG. 1 is a schematic illustration showing in perspective a linear motion rolling contact bearing assembly constructed in accordance with one embodiment of the present invention.

Referring now to FIG. 1, there is schematically shown a linear motion rolling contact bearing assembly constructed in accordance with one embodiment of the present invention. As shown, the present bearing assembly includes a guide rail 1 which is U-shaped in cross section and which extends straight over a desired length. The guide rail 1 has a flat bottom wall and a pair of side walls which extend upright from both sides of the bottom wall to define a channel having a U-shaped cross section. The inner surface of each of the side walls is formed with a guide groove 1a which extends straight in a longitudinal direction so that a pair of parallel guide grooves 1a, 1a is provided to define a predetermined travelling path. The guide rail 1 may extend as long as desired and similarly the pair of guide grooves 1a, 1a may extend as long as desired.

The present bearing assembly also includes a slider 2 which is housed in the channel or space defined by the guide rail 1. The slider 2 is generally rectangular in shape, and, as will become more clear later, the slider 2 is formed with a pair of endless circulation paths, which are provided with rolling members, or balls 3 in the illustrated embodiment. Thus, the balls 3 are partly received in the guide grooves 1a, 1a of the guide rail 1 to provide a rolling contact between the slider 2 and the guide rail 1. Accordingly, the slider 2 may travel along the predetermined travelling path defined by the pair of guide grooves 1a, 1a.

Figure 2:
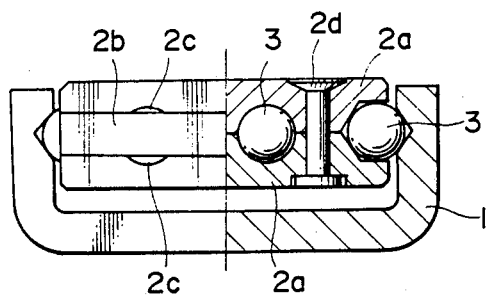
FIG. 2 is a schematic illustration showing in transverse cross section in the right half and in end view in the left half of the assembly of FIG. 1.
Figure 3A:
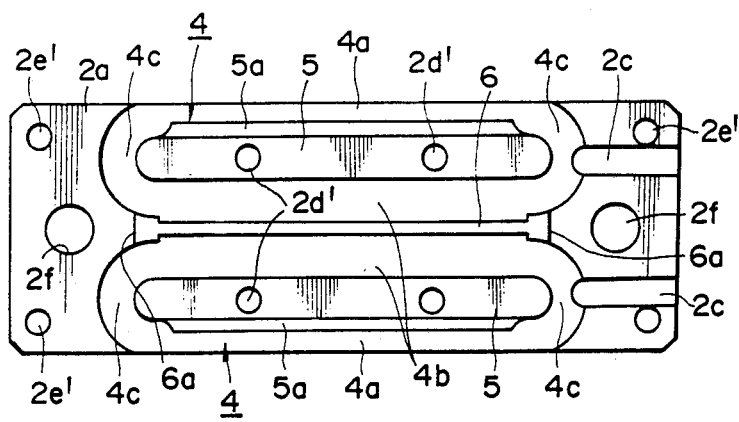
FIG. 3a is a schematic illustration showing the plan view of the bearing plate 2a provided in the assembly shown in FIGS. 1 and 2.
Figure 3C:
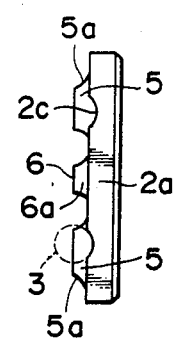
Figure 3B:
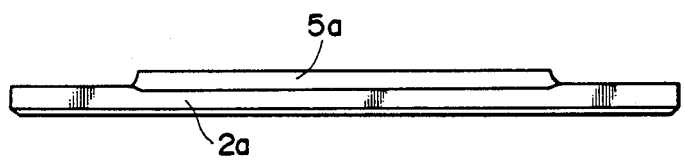

The slider 2 has a four part structure and it includes a pair of upper and lower bearing plates 2a, 2a and a pair of front and rear end plates 2b, 2b. It is to be noted that in the illustrated embodiment the upper and lower bearing plates 2a are identical in structure and the front and rear end plates 2b are also identical in structure. The detailed structure of the bearing plate 2a is shown in FIGS. 3a through 3c. As shown, the bearing plate 2a is generally flat and rectangular in shape. In the illustrated embodiment, the bearing plate 2a is formed with various elements at its top surface but its bottom surface is substantially flat. In the first place, a pair of endless circulation paths 4 is formed on the top surface of the bearing plate 2a as arranged symmetrically side-by-side. Each of the pair of endless circulation paths 4 includes a load path section 4a which extends straight along one side of the bearing plate 2a, a return path section 4b which is located interiorly of the load path section 4a and extends in parallel with the load path section 4a, and a pair of curved connecting path sections 4c, each of which connects the corresponding ends of the load and return path sections 4a and 4b. Thus, the balls 3 may roll along the endless circulation path 4 in either direction freely, and as the balls 3 roll along the load path section 4a, they are securely held within the load path section 4a, but they project partly outside of the load path section 4a as best shown in FIG. 2. As a result, while the balls 3 are located in the load path section 4a, the balls 3 are partly received in the corresponding guide groove 1a of the guide rail 1 to provide a rolling contact between the rail 1 and the slider 2. It is to be noted that the side edge of the load path section 4a preferably extends beyond the center of the balls 3 located in the load path section 4a and curved somewhat inwardly to hold the balls 3 within the load path section 4a. With this structure, the balls 3 are more securely held within the load path section 4a and are prevented from slipping away therefrom undesirably. The bearing plate 4 may be formed by molding using a resin, plastic or any other desired material. However, in the illustrated embodiment, the endless circulation path 4, in particular the load path section 4a, is ground to be finished at high precision.

The bearing plate 4 is also formed with a pair of mounting projections 5, each of which is located inside of the corresponding endless circulation path 4. Each of the mounting projections 5 contributes to define an inner surface of the endless circulation path 4 when the upper and lower bearing plates are combined. For example, the mounting projection 5 provides a side guide surface 5a in the load path section 4a of the endless circulation path 4, so that the side guide surface 5a supports the balls 3 rolling in the load path section 4a. The mounting projections 5 are formed with mounting holes 2d' which extend through the bearing plate 2a. When assembling, a rivet 2d is inserted into the mounting hole 2d' to combine the upper and lower bearing plates 2a. Thus, the top surfaces of the mounting projections 5 of the upper and lower bearing plates 2a are brought into contact when assembled. It is to be noted that any other means than rivet may be used to combine the upper and lower bearing plates 2a.

The bearing plate 2a is also formed with a center projection 6 which is located at the center of the bearing plate 2a extending longitudinally to separate the pair of right and left endless circulation paths 4. The center projection 6 contributes to define an outer side surface of the return path section 4b of each of the pair of endless circulation paths 4. The top surface of the center projection is brought into contact with the top surface of the center projection of the other bearing plate 2a when assembled to define a closed return path section 4b and to provide an additional supporting structure. In the illustrated embodiment, the center projection 6 is slightly recessed on both sides and thus a reinforcing material, such as a metal sheet, may be provided in the recessed portion of the center projection 6 to provide a smooth outer surface of the return path section 4b of the endless circulation path 4. Alternatively, the center projection 6 may be formed without such a recess to provide a smooth outer surface of the return path section 4b.

As best shown in FIG. 3b, the mounting projections 5a project above the surface of the front and rear end portions of the bearing plate 2a. The endless circulation path 4 is defined in the bearing plate 2a as recessed in the top surface thereof. Thus, the side guide surface 5a of the mounting projection 5 is located generally above the top surface of the front and rear end portions of the bearing plate 2a, the side guide surface 5a may be processed with ease at high precision, for example, by grinding. Each of the front and read end portions of the bearing plate 2a is formed with a pair of mounting holes 2e' and a through-hole 2f. In the illustrated embodiment, a pair of feed-in ports 2c is formed in one of the front and rear end portions of the bearing plate 2a. Each of the feed-in ports 2c extends from one end of the bearing plate 2a to the corresponding one of the pair of endless circulation paths 4. The feed-in port 2c is formed such that the balls 3 may move therethrough to be supplied into the corresponding endless circulation path after the upper and lower bearing plates 2a have been combined. Thus, the feed-in port 2c is preferably sized to be somewhat larger than the outer diameter of the balls 3.

Figure 4A:
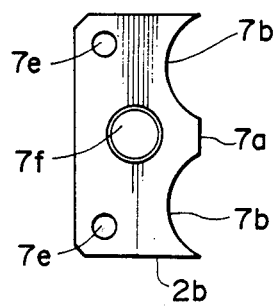
FIG. 4a is a schematic illustration showing the plan view of the end plate 2b provided in the assembly shown in FIGS. 1 and 2.
Figure 4B:
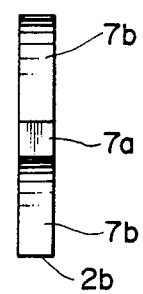
FIG. 4b is a schematic illustration showing the front end view of the end plate 2b.

It is also to be noted that when the two bearing plates 2a, one turned upside down, are put together, a clearance or gap is formed between the upper and lower bearing plates 2a at the front and rear end portions. An end plate 2b shown in FIGS. 4a and 4b may be fitted into such a clearance formed at each of the front and rear end portions. Thus, the end plate 2b has a thickness substantially identical to the clearance formed between the upper and lower bearing plates 2a at the front and rear end portions. The end plate 2b has a straight outer end and a W-shaped inner end in compliance with the pair of curved connecting path sections 4c of the pair of left and right endless circulation paths 4. Thus, the W-shaped inner end of the end plate 2b contributes to define a part of the outer guide wall of the curved connecting path section 4c of the endless circulation path 4. The end plate 2b is formed with a center flat surface 7a which comes into abutment against a flat end surface 6a formed at the end of the center projection 6 of the bearing plate 2a. The end plate 2b is positioned properly by bringing the surface 7a in abutment against the surface 6a of the center projection 6. The end plate 2b is also formed with a pair of mounting holes 7e and a threaded hole 7f. When assembling, a rivet may be fitted into the mounting hole 2e' of the bearing plate 2a and the mounting hole 7e of the end plate, though any other fixing means may also be used. The threaded hole 7f is used for mounting the slider 2 to any desired body using a bolt. Such a mounting structure is advantageous because undesired stress is prevented from being applied to the bearing plate 2a, which constitutes the main body of the slider 2, when the slider 2 is mounted to a desired object by means of bolts. In this case, the end plate 2b also serves as a stress relief element. Moreover, since the end plate 2b is fitted into the gap defined at the end portion, the pair of feed-in ports 2c are plugged to thereby prevent the balls 3 supplied into the endless circulation path 4 from slipping out or egressing from the endless circulation path.

FIGS. 1 and 2 show the slider 2 formed by assembling the upper and lower bearing plates 2a and the front and rear end plates 2b. In this case, the plates 2a and 2b are secured together by using rivets. That is, the upper and lower bearing plates 2a are secured together by rivets 2d and the end plates 2b are secured to the upper and lower bearing plates 2a by rivets 2e. However, the plates 2a and 2b may be secured together by using any other fixing means, such as adhesives and bolts. When assembled, the through-hole 2f of the bearing plate 2a is aligned in position with the threaded hole 7f of the end plate 2b so that when the slider 2 is to be mounted to any desired object, a bolt may be inserted into the through-hole 2f and then threaded into the threaded hole 7f. Thus, the bearing plates 2a are prevented from receiving any undesired stress when the slider 2 is to be mounted to any desired object. Such a structure is extremely advantageous when the present bearing assembly is to be used for high precision applications.

In manufacture, a plurality of bearing plates 2a having the structure as described above are formed, for example, by plastic molding. Then, the bearing plates 2a are machined to process the groove defining an endless circulation path, in particular its load path section, for example, by grinding. Then, a pair of bearing plates 2a thus machined, one turned upside down with respect to the other, is brought into contact in a face-to-face relation and they are fixed together by using rivets 2d. When the two bearing plates 2a are fixed together in this manner, there is generally defined a pair of endless circulation paths arranged side-by-side. Also defined is a pair of feed-in ports, each in communication with the corresponding one of the pair of endless circulation paths. Thus, a plurality of balls 3 are supplied into the pair of endless circulation paths through the pair of feed-in ports. Upon completion of feeding in of the balls 3 into the endless circulation paths, the end plates 2b are fitted into the gaps defined at the front and rear ends and then they are fixedly attached to the combined upper and lower bearing plates 2a by means of rivets 2e to complete the manufacture of the slider 2.

As a result, a pair of endless circulation paths is defined in the slider 2, and each of the pair of endless circulation paths includes a load path section, a return path section and a pair of curved connecting path sections, each connecting the corresponding ends of the load and return path sections. The load path section is defined along one side edge of the slider 2 as extending straight longitudinally such that the balls 3 slightly extend beyond the side edge of the bearing plates 2a when located in the load path section. Accordingly, the balls 3 are partly received in the corresponding guide groove 1a of the guide rail 1 to provide a rolling contact between the slider 2 and the guide rail 1. Since the balls 3 may roll along the endless circulation path indefinitely, the slider 2 may travel along the guide rail 1 as long as desired.

In the above-described embodiment, use is made of spherical balls as the rolling members; however, as an alternative embodiment, use may also be made of cylindrical rollers as the rolling members.

As described above, in accordance with the present invention, there is provided a high precision linear motion rolling contact assembly for use in high precision applications in addition to applications as bearings in copiers, machine tool cabinets and curtain rails. Since the main body of the slider 2 may be manufactured by plastic molding, if desired, the present bearing assembly may be manufactured in volume with ease at low cost. Since the endless circulation path for the rolling members are continuous in structure in its longitudinal direction, the rolling members may roll along the endless circulation path smoothly and without undesired resistance. The slider has a high rigidity because of its structure, though it is relatively small in size. The walls defining the endless circulation path are essentially comprised of the same material so that the dimension of the endless circulation path is well prevented from changing due to thermal effect. In addition, since the slider is comprised of a relatively few number of parts, it is easy to manufacture and low at cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly comprising:
   a rail extending over a predetermined distance and including at least one guide groove which defines a predetermined travel path;
   a slider operatively coupled to said rail to travel along said predetermined travel path in either direction, said slider including a main body provided with at least one endless circulation path and at least one feed-in port for feeding roller members into said endless circulation path, said at least one feed-in port being in communication with said endless circulation path, means for plugging said at least one feed-in port to prevent egress of roller members therefrom, said endless circulation path including a load path section defined along one side of said main body opposite to said guide groove, and said endless circulation path being provided with a plurality of said rolling members which may roll along said endless circulation path whereby said rolling members provide a rolling contact between said slider and said rail by engaging with said guide groove when located at said load path section;
   wherein said main body includes a pair of upper and lower bearing plates which are formed with grooves and which when brought together in a face-to-face contact define said endless circulation path and said at least one feed-in port;
   wherein said upper and lower bearing plates are generally rectangular in shape and identical in structure and said at least one feed-in port is defined at one end portion of said main body; and
   wherein said main body also includes a pair of front and rear end plates fitted into front and rear clearances defined at front and rear ends of said main body when said pair of upper and lower bearing plates are brought together, whereby one of said pair of front and rear end plates serves as said means for plugging.

2. The bearing assembly of claim 1, further comprising means for fixing said pair of upper and lower bearing plates together and means for fixing said pair of front and rear end plates to said pair of upper and lower bearing plates.

3. The bearing assembly of claim 2, wherein each of said pair of upper and lower bearing plates is formed with a through-hole at each of front and rear ends of said main body and each of said pair of front and rear end plates is formed with a threaded hole which is located in alignment with a corresponding through-hole when said main body is assembled.

* * * * *